3,248,229
EMULSIFIER COMPOSITION
Morton Pader, Teaneck, N.J., and Edward Jerome Reid, Fullerton, Calif., assignors to Lever Brothers Company, New York, N.Y., a corporation of Maine
No Drawing. Filed Apr. 10, 1963, Ser. No. 271,894
13 Claims. (Cl. 99—123)

The present invention relates to an emulsifier composition. More particularly, it is concerned with a dry emulsifier composition which can be used in combination with various readily available fats and fat products for a multitude of purposes.

Heretofore, it has been the practice to provide special fats for specific purposes. For example, plasticized fats containing emulsifiers are sold for baking and frying use; liquid fats which may have been winterized are sold for salad and frying use; and powdered fat compositions are sold for whipped topping preparation. Each of these products has desirable properties, but they are inconvenient to have on hand in addition to the other fat products common to the household or bakery, e.g., margarine and butter.

Salad oil has certain culinary advantages over plasticized shortenings, such as its utility in making salad dressings, its resistance to smoking during deep fat frying due to its lack of emulsifiers and its ease of measurement because of its liquid state. Also, it is known in the literature that certain benefits may be derived by using polyunsaturated oils in the diet. But while salad oil has some specific advantages, it has not been used in the home to the greatest extent possible since it does not provide as good a cake as plastic shortening without appropriate modification. This modification involves addition to the oil of an appreciable amount of emulsifying agent, which results in turbidity problems associated with settling out of the emulsifier, and poor properties with respect to frying and salad dressing use. Thus, a simple means whereby the homemaker or bakery can use salad oil for baking is highly desirable.

For dessert toppings, icings, etc., it has been the practice to offer to the housewife or baker complete or almost complete mixes. These have included aerosol-dispensed products; spray dried compositions to which milk is added with subsequent whipping; pastes; etc. In each case, all the fat required is provided with the product; however, the product has limited use, and the housewife or baker must have it on hand along with a variety of other fat compositions.

It is thus highly desirable to provide the housewife and baker with a procedure for employing salad oil for baking without any added effort, without having to change the oil in any way, and without having to provide more than approximately the amount needed at any particular time. It is also highly desirable to provide a procedure for preparing a whipped topping simply by the use of generally available fats, such as margarine, butter, or plastic shortening, whichever happens to be most convenient or least expensive at the time. It is also highly desirable to have available a procedure for preparing certain other types of products, e.g., mayonnaise-type products, with fats which commonly are on hand.

It has now been discovered that a certain emulsifier composition can be provided to accomplish the aforementioned desired commercial features. The emulsifier composition of this invention contains phosphoric acid esters of partial glycerides; lactylated glycerol esters, partial glycol esters or mixtures thereof; and partial glycerol esters. The preferred emulsifier composition is formed by preparing an aqueous emulsion comprising on a dry weight basis (1) about 0.4 to 10 parts of phosphoric acid esters of partial glycerides, (2) about 4 to 60 parts of lactylated glycerol esters, partial glycol esters or mixtures thereof, and (3) about 4 to 60 parts of partial glycerol esters. This aqueous emulsion is dried, e.g., spray dried, to a free-flowing powder. The powdered emulsifier composition therefrom may be employed commercially or in the home in several different ways. Firstly, it may be used with a salad oil. Secondly, it may be combined with a base fat, reconstituted with milk or water and whipped to provide a whipped topping. An icing, a mayonnaise-type dressing or a milk shake may also be formed from the powdered emulsifier. It is particularly significant that the emulsifier composition of this invention can be utilized in conjunction with separately added readily available fat materials without first incorporating the emulsifier composition into the fat.

The phosphoric acid esters of mono- and di-glycerides which are used in combination with other emulsifiers can be formed by reacting a derivative of phosphorus with a glyceride. The derivatives of phosphorus within the purview of this invention for the reaction with a glyceride are as follows: phosphorus pentoxide, pyrophosphoric acid, meta-phosphoric acid, phosphorus halides, ethyl meta-phosphate, phosphorus trioxides, phosphorus pentachloride, phosphorus oxychloride and the like. Process techniques, which have been previously used to provide esters from phosphorus derivatives, are described in U.S. Patent Nos. 2,026,785, 2,177,983 and 2,177,984, the disclosures of which are incorporated herein by reference.

It is possible according to the invention to use a combination of two phosphoric acid esters—one in which the starting fatty acid source for the glyceride is essentially saturated and the other in which the starting fatty acid source for the glyceride has an iodine number of about 50 or higher, i.e., one which is unsaturated. These two types of esters may be employed in a ratio of about 1:1. However, satisfactory results are also obtained if either type of phosphoric acid ester is employed alone. For example, it is operative to use only an ester prepared from partially hydrogenated cottonseed oil, and it is also operative to use only an ester prepared from a mixture of molecularly distilled hydrogenated lard and cotton seed oil monoglycerides.

In the present invention, the phosphoric acid ester with the saturated acid residue and the phosphoric acid ester with the unsaturated acid residue may be prepared separately. The results are also satisfactory if a glyceride with a saturated acid residue and a glyceride with an unsaturated acid residue are mixed together and a phosphoric acid ester thereafter prepared from this admixture. Accordingly, the iodine value of the mono- and diglycerides used to prepare the phosphoric acid esters can vary over a wide range, and good results are obtained from the mono- and diglycerides derived from either completely hydrogenated fats and oils or liquid oils. An oil hardened to about 65 IV is preferred.

The second emulsifying agent employed in the present invention is one or more lactylated glycerol esters. The residues in the esters may be saturated $C_{12}$ to $C_{22}$, preferably $C_{16}$ to $C_{18}$, fatty acids or a mixture of saturated and unsaturated $C_{12}$ to $C_{24}$ fatty acids. A preferred ester is formed by lactylating a mono- and diglyceride concentrate prepared from a source rich in palmitic acid; a suitable lactopalmitate preparation is Drewmulse 9169. The lactostearates are also satisfactory and may be used alone or in a mixture with the lactopalmitates. About 10% of the esters having a saturated residue may be replaced with esters having an unsaturated residue, e.g., lactooleates. Drewmulse 9327, a suitable glyceryl lactooleate, is prepared by lactylating a mono- and diglyceride concentrate made from oleic acid. Other examples of suitable lactylated glycerol esters are those prepared by the processes described in U.S. Patent Nos. 2,509,414; 2,690,971; 2,864,705; 2,957,932; and 2,966,410.

In lieu of all or part of the aforementioned lactylated glycerol esters, one or more partial glycol esters may be used as the second emulsifying component. These partial glycol esters are prepared by reacting dihydric alcohols with higher fatty acids, or fats containing fatty acids. One of the following specific procedures is generally employed: the methylation of fats and the subsequent reaction of the methyl esters with glycol; or the direct esterification of glycol and fatty acids. The aforementioned esterification usually forms, firstly, mono-esters, each containing one hydroxyl and one fatty acid, and, secondly, di-esters with both hydroxyls being substituted with the fatty acid radicals. The mono-esters are preferred over the di-esters; however, a mixture of mono- and diesters is satisfactory. The fatty acid reactant preferably is saturated and has a chain length ranging from 12 to 22 carbon atoms, e.g., lauric, myristic, palmitic, stearic, arachidic and behenic acids. Specific partial esters which are suitable for this invention are propylene glycol monostearate, propylene glycol monopalmitate, propylene glycol monolaurate, and propylene glycol monomyristate, alone, or in admixture with the comparable di-esters.

The third emulsifying agent in the instant emulsifier composition is at least one partial glycerol ester. The partial glycerol esters may be distilled monoglycerides or a mixture of mono- and diglycerides with $C_{12}$ to $C_{24}$ saturated and/or $C_{12}$ to $C_{24}$ unsaturated fatty acid residues. If, for example, a mixture of 50% monoglyceride and 50% diglyceride is used, about twice as much of this third type of emulsifying agent will be required as compared to the use of only distilled monoglycerides.

An aqueous emulsion is formed from the aforementioned emulsifying agents and any other emulsifying agents, such as acetylated monoglycerides, lecithin, etc., which may also be included for their known effects. An encapsulating agent, 2 to 20 parts on a dry weight basis, is generally included in the emulsion in order to obtain a non-oiling, free-flowing dried product. A caseinate, e.g., sodium caseinate, is a suitable encapsulating agent.

The emulsion may also contain about 0.25 to 1 part on a dry weight basis of a carboxymethylcellulose, e.g., sodium carboxymethylcellulose; Kelcoloid "O" (alginic acid esters of propylene glycol); or an edible natural gum, e.g., guar gum, to improve the whipping results if a subsequent topping is formed.

Any known natural or synthetic sweetening agent may be added to the composition in an amount which varies according to taste, e.g., up to 46 parts (dry basis). Sucrose, dextrose, corn syrup and lactose and are the preferred sweetening agents.

In order to accelerate the processing of the emulsion and the speed of blending, up to about 31 parts (dry basis) of a triglyceride are optionally incorporated in the emulsion. As defined herein, a triglyceride is in edible triglyceride fat exclusive of high melting triglyceride fats, such as stearine. A preferred triglyceride for the emulsion is about 70 IV cottonseed oil.

The ratio of water-soluble components, e.g., sodium caseinate, sucrose and sodium carboxymethylcellulose, in the emulsion to oil-soluble components, e.g., the emulsifying agents, may be as low as 1 to 9. However, the preferred ratio is about 1 to 1.

The method for providing an emulsion from the aforementioned components is not critical. Therefore, any procedure known in the art may be employed. It is preferred, however, to dissolve the water-soluble components in the desired amount of water. The oil-soluble components are independently melted and blended, and the blend is slowly added to the aforementioned solution with vigorous agitation to form a rough emulsion. A fine emulsion is subsequently formed by using a two stage homogenizer.

A powder may be prepared from the emulsion by using any drying procedure which will not cause damage to the product. However, the emulsion is generally spray dried to provide a dried product, that is, one containing no moisture or only a trace of moisture, e.g., 1% water.

Thus, in accordance with this invention, a dry emulsifier composition has been provided. Although a multi-purpose shortening may be formed by incorporating about 3 to 30 parts of this dry emulsifier composition into 100 parts of salad oil, it is preferred to add the dry emulsifier composition and salad oil independently and separately to a batter. It has also been found that less salad oil is required for good baking results if it is added as the last ingredient, that is, after the other ingredients of the batter, including the emulsifier, have been mixed. The salad oils are generally those clear liquid oils suitable for use on salads that are also employed commercially for cooking; this includes winterized cottonseed oil, olive oil, corn oil, soybean oil, peanut oil, safflower oil, sunflower seed oil, sesame oil and mixtures thereof. However, as defined herein a salad oil is any edible oil which is liquid at room temperature. The combination of a salad oil and the instant emulsifier composition provides a cake with outstanding volume and quality characteristics.

The dry emulsifier composition of this invention may also be combined with a base fat, reconstituted with milk or water, for example, to about 35% solids, and whipped to form a topping. A base fat is defined herein as a fat having a capillary melting point in the range of about 35° to 40° C., e.g., soybean oil having an iodine value of about 80, partially hydrogenated cottonseed oil, coconut oil, butter oil and mixtures thereof. Butter or margarine may also be used.

Furthermore, the emulsifier composition, salad oil, spices and vinegar can be mixed to yield a thickened mayonnaise-type dressing. Also, the emulsifier composition can be mixed with milk plus oil, shortening, margarine, or butter to provide a thickened milk drink which can be aerated by employing a blending device commonly used for this purpose, e.g., a Waring Blendor. The exact proportions of the ingredients can be varied to provide thicker or less thick and fattier or less fatty products, as desired. By adding more or less sugar and more or less fat, cake icings can be prepared by simple mixing with cold or lukewarm water or milk.

The following examples are submitted to illustrate but not to limit this invention. Unless otherwise indicated, all parts and percentages in the specification and claims are based upon weight.

*Example 1*

Dry emulsifier Formulations 1 and 2 were provided from the ingredients indicated herebelow:

| Ingredient | 1 | 2 |
| --- | --- | --- |
| | Parts by weight | |
| Glyceryl lactopalmitate [1] | 16.0 | 15.1 |
| Distilled 1 IV lard monoglycerides [2] | 4.0 | 12.1 |
| Distilled unhydrogenated lard monoglycerides [2] | 12.0 | 3.0 |
| Phosphoric acid esters of mono- and diglycerides [3] | 1.0 | 0.8 |
| Color | 2.0 | |
| Triglyceride [4] | 20.0 | 30.0 |
| Sodium caseinate | 8.0 | 8.0 |
| Sucrose | 36.0 | 30.1 |
| Sodium carboxymethylcellulose [5] | 1.0 | 0.8 |
| Total | 100.0 | 100.0 |

[1] Drewmulse 9169; palmitic, palmitic, palmitic-13.95; palmitic, lactic, palmitic-50.54; palmitic, lactic, OH-33.25; lactic, lactic, OH-2.42; combined fatty acid being 95% $C_{16}$.
[2] 90% monoesters.
[3] 65 IV cottonseed oil; reacted with $P_2O_5$.
[4] 70 IV cottonseed oil.
[5] Edible grade; 70 high.

Formulation 1 was prepared by dissolving a dry mixture of the sodium caseinate, carboxymethylcellulose and sucrose in the water. The other ingredients, which were oil-soluble, were melted, blended and added slowly to the aqueous solution with vigorous agitation. The rough emulsion therefrom was homogenized at 50°–55° C. in a two-stage Mantin-Gaulin homogenizer. The homogenizing pressure was 1500 p.s.i.g. on the first stage and 1000 p.s.i.g. on the second stage.

The resulting emulsion, 40% solids, was dried in a concurrent spray dryer (Western Precipitation Type "N") with an inlet air temperature of 450° F., an exit air temperature of 190° F., an emulsion feed rate of 9° grams per minute to the bifluid nozzle and a pressure of 40 p.s.i.g. for supplying atomizing air to the bifluid nozzle. The spray dried powder therefrom had a moisture content of about 1%.

The whipping properties of Formulation 1 were determined with 20 grams of the dry emulsifier powder; 2 tablespoons of granulated sugar; ½ cup cold milk; and 30 grams margarine. The emulsifier powder and granulated sugar were dry mixed at low speed in a small Mixmaster bowl. Milk was slowly added thereto and the mixing speed was increased when the dry ingredients were thoroughly wetted. Margarine was subdivided into 4 parts and one part at a time was added with the Mixmaster at high speed. About 3 minutes were required for the above steps.

The mixing was then stopped, and the bowl and beaters were scraped down. Further mixing was performed at high speed for approximately two minutes with the formation of soft peaks. Vanilla was added during this two minute mixing period. The overrun (a term used in evaluating whipped products which is an indication of the air incorporated during whipping) was determined for Formulation 1. This was compared to the results obtained by following a similar procedure with whipping cream.

| Product | Whipping time (min.) | Percent overrun |
|---|---|---|
| Formulation 1 | 3 | 255 |
| Whipping cream [1] | 2 2 | 125 |

[1] Cream having 36% butterfat.
[2] Whipping over two minutes caused butter formation.

A whipped topping was also provided from 30 grams of the dry powdered emulsifier of Formulation 2; 3 tablespoons of granulated sugar; ½ cup cold milk; and 30 grams margarine. The emulsifier powder and granulated sugar were dry mixed in a bowl at low speed with a Mixmaster. Milk was slowly added to the dry ingredients, and the mixing speed was increased when the dry ingredients were thoroughly wetted. The margarine was subdivided into 4 parts, and one part at a time was added with the Mixmaster at high speed. About 3 minutes were required for these steps.

After the mixing was stopped, the bowl and beaters were scraped down. Subsequent mixing at high speed for two minutes with the addition of vanilla during this period gave the desired product.

The specific volume was then determined. Whipped cream was provided using the same procedure for comparative purposes.

Product: Specific-volume (cc./g.)
    Formulation 2 _____ 2.64
    Whipped cream (36% butterfat) _____ 1.71

This example demonstrates that the dried emulsifier prepared in accordance with the present invention is capable of being employed to form a whipped topping comparable be whipped cream and a dried whipped topping composition in which all the fat is encapsulated together with the emulsifier.

*Example II*

The baking properties of Formula 1 were determined by making a 2 egg yellow blending cake with the following ingredients: 2 cup sifted cake flour; 1⅓ cups granulated sugar; 2½ teaspoons of baking powder; 1 teaspoon of salt; 1 cup minus 2 tablespoons of milk; 2 eggs; 1 teaspoon vanilla; ½ cup salad oil; and 40 grams emulsifier powder (Formulation 1). The dry ingredients, including the emulsifier powder, were sifted together. The salad oil (winterized cottenseed oil) and two-thirds of the milk were added to the dry ingredients. After mixing for two minutes at medium speed with a Mixmaster, the balance of the milk and the eggs were added and mixed for two minutes at medium speed. The specific volume of the resulting batter was then determined.

The batter was then divided between two greased, paper-lined 8" layer cake pans and baked approximately 22 minutes at 375° F. After cooling, the cakes were removed from the pans. The cake volume was noted.

Cakes were also prepared and tested in a similar manner with commercial shortening; salad oil without the emulsifier composition of this invention being added also to the batter; and Formulation 2 being added to the batter with salad oil. The results of the tests are indicated herebelow.

| Type of shortening | Batter vol. (cc./g.) | Cake vol. (cc.) |
|---|---|---|
| Commercial shortening [1] | 1.20 | 1,225 |
| Salad oil, 100 gms | 0.90 | 1,050 |
| Salad oil plus Formulation 1 of Example I | 1.35 | 1,320 |
| Salad oil plus Formulation 2 of Example I [2] | 1.14 | 1,275 |

[1] Plasticized vegetable shortening containing mono- and diglycerides, 100 grams.
[2] Salad oil, 100 grams; emulsifier composition, 30 grams.

It is evident from this example that salad oil is satisfactory for making cakes when it is used in conjunction with the dry emulsifier composition of the present invention.

*Example IIII*

Formulations 3, 4 and 5 were prepared having the compositions on a dry weight basis as shown below.

| | 3 | 4 | 5 |
|---|---|---|---|
| | Parts | | |
| Glyceryl lactopalmitate | 19.51 | 14.68 | [1] 16.00 |
| Myverol 18:00 [2] | 4.88 | 3.67 | 4.00 |
| Myverol 18:40 [3] | 14.63 | 11.00 | 12.00 |
| Triglyceride [4] | 19.51 | 19.56 | 20.00 |
| PAEM [5] | 0.98 | 0.98 | 1.00 |
| Carotene [6] | 1.95 | 1.96 | 2.00 |
| Sodium caseinate | 7.80 | 9.78 | 8.00 |
| Lactose | 29.27 | 37.24 | |
| Sodium carboxymethyl cellulose [7] | 0.98 | 0.98 | 1.00 |
| Sucrose | | | 36.00 |
| NaOH | | 0.15 | |
| Citric Acid | 0.49 | | |

[1] Drewmulse 9169.
[2] Distilled monoglycerides from completely hydrogenated lard.
[3] Distilled monoglycerides from unhydrogenated lard.
[4] Cottonseed oil, refined, bleached, and hydrogenated, to an IV of about 74; dilation 600 at 20° C.
[5] Phosphoric acid esters prepared by reacting $P_2O_5$ with a mixture of mono- and diglycerides obtained from selectively hydrogenated cottonseed oil of 65 IV.
[6] Color; 0.5% solution.
[7] Same as in Example I.

Emulsions containing 58–60% water were formed from Formulations 3 and 4 which were subsequently homogenized and freeze dried to a water content of about 2%. The screen analysis of dried Formulation 3 was as follows: on No. 20 mesh size, 5.4%; on No. 45 through No. 20, 21.6%; on No. 70 through No. 45, 70.2%; and through No. 70, 2.7%. The particle size distribution of dried Formulation 4 was as follows: about 36% were between No. 20 and No. 42 mesh size and about 60% passed through a No. 42 screen.

An emulsion of Formulation 5 with 60% water was spray dried with the apparatus described in Example I by using an air inlet temperature of 440° F. and an atomizing air pressure of 25–30 p.s.i.g. The water content of the spray dried emulsifier was about 1.5% and 80% of the dried particles passed through a No. 35 screen.

Two-egg yellow cakes were made with the dried emulsifier of Formulation 3 in accordance with a two-stage recipe. In the first stage, 2 cups cake flour, 1⅓ cups granulated sugar, 2½ teaspoons baking powder, 1 teaspoon salt and 40 grams emulsifier were sifted together, and 9 tablespoons milk were added and mixed for two minutes. In the second stage, two eggs, 5 tablespoons milk and 1 teaspoon vanilla were added, and the batter was again mixed for two minutes. The batter had a specific volume of 1.42 ml. per gm., and the cake volume was 1230 ml. The cake was given a rating of only 84, based on a system of evaluating the cake volume, grain, texture, eating quantity, crust quality, and symmetry of form on a 0–100 scale.

However, when 50 gm. of a refined and bleached winterized cottonseed oil as a salad oil were incorporated after the second stage mixing in the batter which had the dry emulsifier of Formulation 3 therein, the specific volume of the batter was 1.36., the cake volume was 1265 ml. with a rating of 100. With 100 gm. salad oil plus the emulsifier, the figures were 1.30, 1230 and 100, respectively. With 100 gms. of plasticized shortening containing mono- and diglycerides (control), the figures were 1.18, 1265 and 100.

When salad oil was incorporated during the first-stage mixing into the batter having the emulsifier of Formulation 3 therein, the batter and the cake made therefrom were evaluated as follows:

| Salad oil (gm.) | Batter volume (ml./gm.) | Cake volume (ml.) | Rating |
|---|---|---|---|
| 25 | 1.20 | 1,275 | 94 |
| 50 | 1.12 | 1,280 | 94 |

Cakes were made using the recipe described for Formulation 3, with 30 gm. of dry powdered emulsifier of Formulation 4 without salad oil and with 100 gm. salad oil added after the second stage mixing. The evaluation of the batter and cakes was as follows:

| Salad oil (gm.) | Batter volume (ml./gm.) | Cake volume (ml.) | Rating |
|---|---|---|---|
| None | 1.36 | 1,170 | 88 |
| 100 | 1.30 | 1,260 | 97 |

Cakes were baked using the aforementioned recipe with Formulation 3 emulsifier therein except that 40 gm. of Formulation 5 emulsifier were employed in lieu thereof and 110 gm. (½ cup) of salad oil were added during the first stage mixing. Separate baking tests were made on products taken from the cyclone and from the bottom of the tower on two successive days (A and B). One run was also made using 28 gm. of Formulation 5 emulsifier instead of 40 gm., and one run was made with 100 gm. of plasticized shortening containing mono- and diglycerides as a control, i.e., no emulsifier and no salad oil. The baking evaluation was as follows:

| Date | Product from | Emulsifier (gm.) | Batter volume (ml./gm.) | Cake volume (ml.) | Rating |
|---|---|---|---|---|---|
| A | Cyclone | 40 | 1.32 | 1,290 | [1] 95 |
| A | Bottom | 40 | 1.30 | 1,245 | [1] 95 |
| A | Control | | 1.17 | 1,275 | 98 |
| B | Cyclone | 40 | 1.36 | 1,320 | 96 |
| B | Bottom | 40 | 1.35 | 1,275 | 96 |
| B | Bottom | 28 | 1.15 | 1,245 | 96 |

[1] Slightly sunken center.

Cakes (2-egg yellow) were made using 40 gm. of Formulation 5 emulsifier and ½ cup (110 gm.) cottonseed-derived salad oil. Specific volumes of the batters were 1.30–1.35 ml. per gram; cake volumes were 1245–1320 ml.; and the ratings ranged from 95–96. A cake, which was provided from a similar recipe except that the shortening ingredient was 100 gm. of plasticized shortening containing mono- and diglycerides, had a batter volume of 1.17 ml. per gram, a cake volume of 1275 ml. and a rating of 98.

It is manifest from the data in this example that a suitable cake is prepared by using a salad oil in conjunction with the dried emulsifier composition of this invention and that it is especially preferred to add salad oil as the last ingredient in a batter containing the dried emulsifier composition.

*Example IV*

Whipped toppings 1, 2 and 3 were prepared according to the following recipes:

| Whipped topping | Formulation 5 emulsifier (gm.) | Margarine (tbsp.) | Sucrose (tbsp.) | Milk (cup) |
|---|---|---|---|---|
| 1 | 28 | 2 | 3 | ½ |
| 2 | 28 | 2 | 2 | ½ |
| 3 | 20 | 2 | 3 | ½ |

These whipped toppings were evaluated as follows:

| No. | Mixing time (min.) | Overrun (percent) | Peaks | Body | Collapse (1 hr.) percent |
|---|---|---|---|---|---|
| 1 | 5 | 271 | Good- | Fair+ | 28 |
| 2 | 5 | 260 | Good+ | Fair+ [2] | 28 |
| 3 | 7 | 200 | Fair+ [1] | Good- | 16.1 |

[1] Soft.
[2] Slightly frothy.

This example indicates that an acceptable whipped topping can be made using a base fat, normally found in the kitchen, e.g., margarine, plus an emulsifier of the invention.

Having set forth the general nature and specific embodiments of the present invention, the true scope is now particularly pointed out in the appended claims.

What is claimed is:

1. A multi-purpose emulsifier composition capable of being employed subsequently with an appropriate fat to form a cake batter, whipped topping, icing, thickened milk drink and mayonnaise-type dressing which comprises:
   (a) phosphoric acid esters of mono- and diglycerides;
   (b) a member selected from the group consisting of
       (1) lactylated esters of glycerol and higher fatty acids,
       (2) partial esters of glycols and higher fatty acids and
       (3) mixtures thereof; and
   (c) partial esters of glycerol and higher fatty acids.

2. A dried multi-purpose emulsifier composition capable of being employed subsequently with an appropriate fat to form a cake batter, whipped topping, icing, thickened milk drink and mayonnaise-type dressing which comprises:
(a) about 0.4 to 10 parts of phosphoric acid esters of mono- and di-glycerides;
(b) about 4 to 60 parts of a member selected from the group consisting of
(1) lactylated esters of glycerol and higher fatty acids,
(2) partial esters of glycols and higher fatty acids and
(3) mixtures thereof; and
(c) about 4 to 60 parts of partial esters of glycerol and higher fatty acids.

3. A spray dried multi-purpose emulsifier composition capable of being employed subsequently with an appropriate fat to form a cake batter, whipped topping, icing, thickened milk drink and mayonnaise-type dressing which comprises:
(a) about 0.4 to 10 parts of phosphoric acid esters of mono- and di-glycerides;
(b) about 4 to 60 parts of a member selected from the group consisting of
(1) lactylated esters of glycerol and higher fatty acids,
(2) partial esters of glycols and higher fatty acids and
(3) mixtures thereof;
(c) about 4 to 60 parts of mono- and di-glycerides;
(d) about 2 to about 20 parts of an encapsulating agent;
(e) about 0.25 to 1.00 part of a carboxymethylcellulose;
(f) a sweetening agent; and
(g) a triglyceride exclusive of high melting fats.

4. A batter of cake-forming ingredients which comprises:
(a) about 100 parts of a salad oil; and
(b) about 3 to 30 parts of a dried emulsifier composition comprising
(1) about 0.4 to 10 parts of phosphoric acid esters of mono- and di-glycerides;
(2) about 4 to 60 parts of a member selected from the group consisting of
[a] lactylated esters of glycerol and higher fatty acids,
[b] partial esters of glycols and higher fatty acids and
[c] mixtures thereof; and
(3) about 4 to 60 parts of partial esters of glycerol and higher fatty acids.

5. A batter of cake-forming ingredients which comprises:
(a) about 100 parts of a salad oil; and
(b) about 3 to 30 parts of a dried emulsifier composition comprising
(1) about 0.4 to 10 parts of phosphoric acid esters of mono- and di-glycerides;
(2) about 4 to 60 parts of a member selected from the group consisting of
[a] lactylated esters of glycerol and higher fatty acids,
[b] partial esters of glycols and higher fatty acids and
[c] mixtures thereof;
(3) about 4 to 60 parts of mono- and di-glycerides;
(4) about 2 to 20 parts of an encapsulating agent;
(5) about 0.25 to 1.00 part of a carboxymethylcellulose;
(6) a sweetening agent; and
(7) a triglyceride exclusive of high melting fats.

6. A spray dried emulsifier multi-purpose composition capable of being employed subsequently with an appropriate fat to form a cake batter, whipped topping, icing, thickened milk drink and mayonnaise-type dressing which comprises:
(a) 16.0 parts of glyceryl lactopalmitate;
(b) 4.0 parts of distilled 1 IV lard monoglycerides;
(c) 12.0 parts of distilled unhydrogenated lard monoglycerides;
(d) 1.0 part of phosphoric acid esters formed from mono- and di-glycerides of 65 IV cottonseed oil reacted with phosphorus pentoxide;
(e) 2.0 parts of color;
(f) 20.0 parts of 70 IV cottonseed oil;
(g) 8.0 parts of sodium caseinate;
(h) 36.0 parts of sucrose; and
(i) 1.0 part of sodium carboxymethylcellulose.

7. A fat-free, multi-purpose emulsifier composition capable of being employed subsequently with an appropriate fat to form a cake batter, whipped topping, icing, thickened milk drink and mayonnaise-type dressing which comprises:
(a) phosphoric acid esters of mono- and di-glycerides;
(b) a member selected from the group consisting of
(1) lactylated esters of glycerol and higher fatty acids,
(2) partial esters of glycols and higher fatty acids and
(3) mixtures thereof; and
(c) partial esters of glycerol and higher fatty acids.

8. The composition according to claim 2 in which the phosphoric acid esters of mono- and di-glycerides are an ester with a saturated fatty acid residue and a separately prepared ester with an unsaturated fatty acid residue.

9. The composition according to claim 2 in which the lactylated glycerol esters are an ester with a saturated fatty acid residue and up to 10% of an ester with an unsaturated fatty acid residue.

10. The composition according to claim 2 in which the partial glycol esters are selected from the group consisting of
(a) monoesters and
(b) an admixture of monoesters and diesters.

11. The composition according to claim 2 in which the partial glycerol esters are selected from the group consisting of
(a) distilled monoglycerides and
(b) mono- and diglycerides.

12. The cake batter according to claim 4 in which the salad oil is selected from the group consisting of
(a) cottonseed oil,
(b) olive oil,
(c) corn oil,
(d) soybean oil,
(e) peanut oil,
(f) safflower oil,
(g) sunflower seed oil,
(h) sesame oil, and
(i) mixtures thereof.

13. A cake batter which comprises:
(a) ½ cup of winterized cottonseed oil;
(b) 40 grams of dried emulsifier composition comprising:
(1) 16.0 parts of glyceryl lactopalmitate;
(2) 4.0 parts of distilled 1 IV lard monoglycerides;
(3) 12.0 parts of distilled unhydrogenated lard monoglycerides;
(4) 1.0 part of phosphoric acid esters formed from mono- and diglycerides of 65 IV cottonseed oil reacted with phosphorus pentoxide;
(5) 2.0 parts of color;
(6) 20.0 parts of 70 IV cottonseed oil;

(7) 8.0 parts of sodium caseinate;
(8) 36.0 parts of sucrose; and
(9) 1.0 part of sodium carboxymethylcellulose;
(c) 2 eggs;
(d) 2 cups cake flour;
(e) 1⅓ cups sugar;
(f) 2½ teaspoons baking powder;
(g) 1 teaspoon salt;
(h) 1 cup minus 2 tablespoons milk; and
(i) 1 teaspoon vanilla.

References Cited by the Examiner

UNITED STATES PATENTS

| | | | |
|---|---|---|---|
| 2,024,357 | 12/1935 | Harris | 99—92 |
| 2,132,436 | 10/1938 | Reynolds et al. | 99—92 X |
| 2,768,082 | 10/1956 | Crossland et al. | 99—92 |
| 2,913,342 | 11/1959 | Cameron et al. | 99—123 |
| 2,978,329 | 4/1961 | Cochran et al. | 99—118 X |
| 3,098,748 | 7/1963 | Noznick et al. | 99—118 |

A. LOUIS MONACELL, *Primary Examiner.*